Patented July 11, 1939

2,165,324

UNITED STATES PATENT OFFICE 2,165,324

STABLE BLENDED OIL

Peter J. Wiezevich and Jones I. Wasson, Elizabeth, N. J.; said Wiezevich, now by judicial change of name Peter J. Gaylor, assignors to Standard Oil Development Company, a corporation of Delaware No Drawing. Application April 27, 1935,
Serial No. 18,697

8 Claims. (Cl. 87—9)

This invention deals with the preparation of stable blended oils, and more particularly, with the preparation of stable oil blends containing thickened oils and oxidation inhibitors.

The term "thickened oil" is employed to designate an oil which has been made more viscous by modification of the constituents of said oil, as for example, by heat treatment, voltolization, treatment with air, boron fluoride, etc. Such oils may have Saybolt viscosities ranging from 100 to 700 to 1000 or 5000 or even more at 210° F. Thickened oils of this type have to some extent been employed either alone or with other oils for lubricating and other purposes. However, their use has been limited to a great extent due to their instability and their tendency to produce a varnish-like material at elevated temperatures capable of sticking rings in internal combustion engines.

The object of this invention is to produce stable blends of such thickened oils. A further object is to employ these thickened oils as dispersing agents for oxidation inhibitors in a variety of oils. Other objects will be apparent from the subsequent discussion.

It has been found that a large number of oils, especially highly refined mineral oils, tend to sludge considerably when blended with oxidation inhibitors and subjected to oxidation conditions. Apparently, although the known oxidation inhibitors lower the oxidation rate of oils, many of them tend to modify the oxidation in such a manner as to accelerate sludging to a considerable extent. This is illustrated by the following data on some tests made by blowing air at 341° F. through a definite quantity of oil at a definite rate. Samples were taken at intervals and the amount of sludge present was measured:

*Example 1*

| Oil | Sludge, mg./10 gm. after— | | | | Oxidation rate at 200° C. c. c. of oxygen absorbed per 10 gms. per 15 minute intervals | | |
|---|---|---|---|---|---|---|---|
| | 24 hrs. | 48 hrs. | 72 hrs. | 96 hrs. | | | |
| Hydrogenated oil | 0 | 1 | 1 | 2 | 132 | 116 | 65 |
| Ditto+0.1% beta-thionaphthol | 4 | 5 | 66 | | 24 | 16 | 17 |
| Ditto+0.1% beta-thionaphthol+5% voltolized rapeseed oil | 1 | 1 | 1 | 21 | | | |

These data show that although the oxidation inhibitor (beta-thionaphthol) greatly reduced the oxidation rate of the oil, it likewise increased the amount of sludge formed during oxidation. However, by adding the inhibitor to a thickened oil (voltolized rapeseed oil) blend this effect was reduced to a considerable extent.

In the case of aviation lubricating oils, a flat temperature-viscosity curve (i. e. a high viscosity index) is desirable, both from the point of low temperature starting and oil consumption at high temperature operation. In order to obtain high viscosity index, most petroleum oils must be extracted with a preferential solvent, or be aluminum chloride treated, acid treated, clay treated, hydrogenated, or highly refined in some other manner. In some cases oils of high viscosity index may be prepared synthetically. However, most of these oils refined to high viscosity indices (V. I.'s) when blended with thickened oils tend to cause ring sticking and varnish formation under severe conditions. This is demonstrated by the following tests made on a C. F. R. (Cooperative Fuel Research) engine with a jacket temperature of 390° F., using 2½ lbs. of lubricating oil for 14 hours, a test accepted by the U. S. Army Air Corps for performance under hot conditions:

*Example 2*

| Oil | Piston demerit | Percent reduction of piston demerit | Rings stuck | | Varnish demerit |
|---|---|---|---|---|---|
| | | | No. | Degrees | |
| Highly refined mineral lubricating oil | 4.15 | | 2 | 450 | 6 |
| Ditto+8% voltolized rapeseed oil | 4.91 | −18 | 3 | 540 | 5 |
| Ditto+8% voltolized rapeseed oil+0.2% tert-butyl phenol sulfide | 1.25 | +70 | 0 | 0 | 4 |

The piston demerit is the rating given based on the general appearance of the pistons, the worse the condition, the higher the value. The above table gives the number of pistons stuck as well as the total number of degrees of the stuck portion of the piston rings. In the last column the effect of varnish on the condition of the piston is noted, the better condition having the lower figure.

It will be seen that, in the case of the above lubricating oil base stock, the addition of thickened oil detrimentally affected the piston demerit rating, whereas the addition of the oxidation inhibitor to the blend containing the thickened oil improved the piston demerit rating considerably. Since no rings were stuck, the advantages obtained by employing such a blend are apparent. This appears to be due to a mutual or cooperative action of the thickened oil with the inhibitor, since the inhibitor added to the mineral oil alone does not decrease the demerit rating to any remarkable degree, as can be seen from the following data on another sample of oil:

*Example 3*

| Oil | Piston demerit | Percent reduction of piston demerit | Rings stuck | |
|---|---|---|---|---|
| | | | No. | Degrees |
| Highly refined oil | 6.65 | | 3 | 1080 |
| Ditto+0.2% tertiary butyl phenolsulfide | 4.26 | 36 | 3 | 810 |

In this case the reduction in piston demerit rating was only 36% compared with 70% reduction in the third blend in Example 2 containing both oxidation inhibitor and thickened oil. Furthermore there was no reduction in the number of rings stuck.

In carrying out this invention, therefore, it is necessary to add two materials to the base stock, namely a thickened oil, and an oxidation inhibitor.

The thickened oils may be prepared by any of three methods, i. e. (1) Heat treatment, (2) Voltolization, and (3) Chemical reagents. Since the thickened oils are to be blended with other oils, it is desirable that the thickening operation be continued only as long as the product remains soluble in the oil in which it is to be blended.

Heat treatment is generally employed for thickening glyceride oils such as linseed oil, soya bean oil, whale oil, rapeseed oil, cottonseed oil, lard oil, and the like. The usual method of treatment consists in batch heating at 500–700° F. using nitrogen or hydrogen gas as a means of agitation, bubbling said gas through the oil as it is heated. Catalysts such as clay, charcoal, phosphoric acid, bauxite, metallic soaps, alkalis, and the like may be added during the operation. The thickening process may also be accelerated by passing the glyceride through a tube heated at 500–1400° F., the time of heating being regulated by the temperature; that is, the higher the temperature, the lower the time of contact in the heated zone. This varies somewhat with the type of stock treated. For linseed oil, a time of heating of 8–10 hours at 570° F. in a glass vessel gives a very desirable product. A similar effect is obtained by passing the oil through a glass or aluminum tube at 1200° F. with 2–5 seconds time of contact. Thickening under pressure or vacuum at elevated temperatures alone or in the presence of steam, hydrogen, or other agents can also be employed.

Mixtures of the different fatty oils or synthetic esters may be used as raw materials for the thickening operation, and they may be admixed with mineral oils, aromatic compounds, and other materials prior to or during thickening. Although a temperature of 570° F. is most desirable in batch operation, lower temperatures in the neighborhood of about 390° F. and higher temperatures even in the range of 1470–1650° F. may be reached, depending upon the type of process used. The agitation may be mechanical, although gases or vapors such as nitrogen, steam, air, ammonia, ozone, formaldehyde, and the like may be employed for this purpose. In many cases, especially those employing air or ammonia, the agitating gas or vapors appear to react with the materials treated. However, when nitrogen is employed for agitation, the oil undergoes a decomposition due to the heat alone, giving off volatile vapors containing aldehydes and water, which apparently produce some unsaturated residues in the reaction mixture, causing a gradual thickening or "polymerization" of the oil. However, excessive destruction of the molecule or cracking beyond the stage necessary for thickening is to be avoided, except in cases where it is simultaneously accompanied by hydrogenation. Although the products may be volatile to some extent, it is preferred to produce thickened "polymers" which will not distil over under moderate vacuum (say 10–20 mm. of mercury) without substantial decomposition. It is also advantageous to keep the acidity of the product below 50 mgs. KOH per gm. of oil. This limit is determined by titrating samples at various intervals during the heating period.

During heating, generally the molecular weight and viscosity of the product rise as does the acidity, while the iodine number decreases. There are exceptions, however, as for instance castor oil loses viscosity on heat treatment, but thickens markedly on blowing with air thereafter. This is within the purview of this invention. For instance, in the case of linseed oil heated at 293° C., the molecular weight rose from 770 to 1760 in 10 hours of heating, while the iodine number dropped from 161 to 126. Yet, with this decrease in unsaturation, the product was highly unstable, and unsuitable as a lubricant or blending agent in lubricants. Other materials such as glycol oleate, glyceryl naphthenate, butyl acetyl ricin-oleate, hydroxy-stearic acid, ethyl linoleate, ethyl abietate, and similar materials, and especially esters or glycerides, in many cases may be so treated to be employed as raw materials or added to the fatty oils before or after heat treatment according to this invention.

Thickening, or "polymerization", by voltolization is especially suitable for hydrocarbon oils and waxes, saturated or unsaturated esters, fatty oils, substituted hydrocarbons, synthetic or natural waxes, synthetic oils, synthetic esters such as tricresyl phosphate, dibutyl phthalate, butyl tartrate, triethyl citrate, butyl lactate, etc., and other organic compounds either in the crude or distilled state or partially or highly refined state. It is preferable to employ raw materials having boiling points above 200 or 250° C., although lower boiling substances may be voltolized if cooling and other precautions are taken during voltolization. The operation is generally carried out by passing the raw material through a silent electric discharge, generated by 4,000–10,000 volts, 60–3000 cycles at 5 to 20 to 300 mm. or more vacuum, and room temperature, although lower temperatures and temperatures as high as 200 or 300° C. may be employed.

When an organic compound is voltolized, its molecular weight gradually increases, often to values of 1000, 1500, 3000 or even more, and its unsaturation and oxidizability also increase in many cases. For instance, in the case of a hydrogenated S. A. E. 40 lubricating oil of 726 viscosity Saybolt at 100° F. and 73.6 at 210° F., the oxidation rate, as measured by the number of c. c. of oxygen absorbed at 200° C. by 10 c. c. of oil at 15 minute intervals was 70, 50 and 45. After 149 hours of voltolization at 8000 volts and 1200 cycles, the viscosities of the product were 1167 at 100° F. and 95.6 at 210° F., while the oxidation rate increased to 288, the latter greatly reducing the value of the oil for lubricating and other purposes.

Thickened oils may also be obtained by treating various oils with chemical reagents. For instance, it is possible to increase the viscosity of fatty oils to a large extent by blowing through them boron fluoride at ordinary or elevated temperatures. Hydrogen fluoride and aluminum chloride have similar but not as pronounced effects. Oxidation at elevated temperatures, treatment with selenium or sulfur, and nitration with nitric acid followed by heating, if desired, are some of the other chemical means which may be employed for thickening oils.

Mixtures of oils thickened by one or more of these processes are within the scope of this invention. These thickened oils are employed in proportions of as low as 0.1% or as high as 80 or 90%, although the preferred amounts range in the neighborhood of 5 to 10 to 20% of the total blend. Also the oxidation inhibitors may be added to the oils during the thickening operation in many cases.

Oxidation inhibitors to be employed for preparing the blends according to this invention may be aromatic compounds having hydroxy and/or amino and/or sulfur groups, such as alpha naphthol, amino aromatics, alpha-naphthylamine, phenolic compounds of high molecular weight, natural inhibitors from petroleum, tertiary butyl phenol sulfide, organic polysulfides and polyselenides, stabilized aromatic inhibitors, such as para hydroxy phenyl normal amyl sulfide, ethylene phenyl sulfide, organo metallic compounds, as for example, triphenyl bismuth, tetraphenyl tin, aromatic mercaptans and disulfides as thio beta naphthol, diphenol disulfide, nitro aromatics, diphenylguanidine, mercaptobenzothiazole, aliphatic hydroxy amines, allyl iso-thiocyanate, and other similar materials having inhibiting properties at low and/or high temperatures. Sulfur or selenium may also be used in a number of cases. The amounts preferred for use are 0.01 to 0.1% to 1% to 5% or even more, depending on the oxidation properties of the thickened oil.

Materials employed as base stocks for this invention may be paraffinic, naphthenic, aromatic and/or mixed type mineral oils, fatty oils, synthetic oils, esters, waxes, oils obtained by the destructive distillation of wood, coal, lignite, peat, shale, and the like, either in the crude form, or partially or highly refined by distillation, treatment with selective solvents, chemical reagents, hydrogenation, absorptive agents, and the like. Such oils may be very light, say of 30 to 50 to 150 viscosity Saybolt, or medium, such as the S. A. E. grades from 20 to 50 or more, or even heavy oils such as residuals or blends. They may be used in the proportions of as low as 1% or as high as over 99%, although it is generally preferable to employ them in amounts more than 50%, such as say 70%, 80%, 90% or 95% of the total blends.

The following examples serve to show some of the types of products which may be prepared according to this invention:

Example 4

99% voltolized di-N-butyl phthalate, 167 vis. Saybolt at 100° F., 43 vis. at 210° F., iodine number 11.3.

1% hydroxy amine from liquid phase cracked wax.

This blend is an exceptionally good turbine oil either alone or when mixed with about 40% of a naphthenic petroleum oil.

Example 5

99.5% heat thickened soya bean oil of 520 sec. viscosity at 210° F. prepared by heating soya bean oil at 572° F. in a glass vessel for 24 hours while blowing with nitrogen.
0.5% tert-butyl phenol sulfide.

This blend is mixed with 80% of hydrogenated mineral lubricating oil and employed as an internal combustion engine lubricant.

Example 6

Rapeseed oil is voltolized to a viscosity of 278 at 210° F., and 1% of triphenyl bismuth is added thereto while hot. The product is then blended with 90% of a Pennsylvania lubricating oil, giving an exceptionally good aviation oil.

Example 7

A voltolized paraffin wax of 322 viscosity at 210° F. is blended with 85% of a synthetic oil prepared by polymerizing cracked wax with aluminum chloride. To the mixture is then added 0.1% of thio beta naphthol. The product is then employed as a heavy lubricating oil and as a constituent of greases.

Example 8

Whale oil is heated in a glass vessel at 572° F. for 5½ hours, using air for agitation. The product, which has a viscosity of 2562 seconds at 210° F., is admixed with 50% of a Pennsylvania oil of 50 viscosity at 210° and voltolized for 5–10 hours. The mixture is then blended with 0.5% of allyl iso-thiocyanate and the resulting blend may be employed as a constituent of lubricants, soluble oils, and the like.

Example 9

A Pennsylvania aviation lubricating oil is blended with 10% of voltolized rapeseed oil and small amounts of various inhibitors are added. The oxidation rates (in cc. of oxygen absorbed per 10 cc. of oil per 15 minute period at 200° C.) compare with the original oil as follows:

```
                                        Oxygen absorption
Aviation oil+10% voltolized rape-
  seed oil_____  26–30–48–44
Ditto+0.1% alpha naphthol_____  17–23–29–42
Ditto+0.1% naphthylamine_____  11–14–17–19
Ditto+0.1% diacetyl tert-butyl phe-
  nol_____  21–18–21–30
```

In carrying out this invention it is possible to employ a number of alternative methods. For instance, the oxidation inhibitor may be added to the thickened oil, and this concentrate may be blended into the base stock when desired, or else the inhibitor may be added to the base stock, or it may be dissolved in a separate solvent which may be removed after blending.

The blended oils prepared according to this invention may be incorporated with and used in lubricants, fuels, industrial oils, in conjunction with other substances such as polymerization inhibitors, oiliness agents, extreme pressure lubricating agents, high molecular weight linear polymer oil thickeners, sludge dispersing agents, oil soluble resins, metallic or non-metallic soaps, pour inhibitors, emulsifiers, dyes, colloidal materials, sulfonated compounds, and the like. Thickened oils containing oxidation inhibitors such as those disclosed herein may be also employed in fuels, coating compositions, resins, rubber, wax, plastics, emulsions, soluble oils, industrial oils, and the like.

Although there have been shown and described certain specific embodiments of this invention, many modifications thereof are possible. This invention, therefore, is not to be restricted except in so far as is necessitated by the prior art and by the spirit of the appended claims.

We claim:

1. A lubricant of relatively high viscosity suitable for lubricating internal combustion engines, containing a lubricating oil having a viscosity of 20–150 seconds Saybolt at 210° F., a dissolved oxidation inhibitor having a Sligh sludge increasing effect, and a thickened oil, soluble in said lubricating oil, and having the dual effect of increasing the viscosity of the lubricating oil and of lowering the Sligh sludge value of the inhibited oil.

2. A lubricant according to claim 1 in which the thickened oil added to the inhibited lubricating oil is a thickened fatty oil having a molecular weight of above 1000.

3. A lubricant according to claim 1 in which the thickened oil added to the inhibited lubricating oil has a viscosity of about 100–5000 seconds Saybolt at 210° F.

4. A lubricant according to claim 1 in which the thickened oil added to the inhibited lubricating oil is a voltolized oil having a molecular weight of above 1000.

5. A lubricant according to claim 1 in which the thickened oil added to the inhibited lubricating oil is a voltolized fatty oil.

6. A lubricant according to claim 1 in which the thickened oil added to the inhibited lubricating oil is a thickened glyceride.

7. A lubricant according to claim 1 in which the thickened oil added to the inhibited lubricating oil is a voltolized rapeseed oil.

8. A lubricant according to claim 1 in which the thickened oil added to the inhibited lubricating oil is added in an amount of about 5–20% of the total composition.

PETER J. WIEZEVICH.
JONES I. WASSON.